United States Patent [19]

Orain

[11] Patent Number: 4,557,491
[45] Date of Patent: Dec. 10, 1985

[54] SEALING DEVICE INCLUDING A BELLOWS, IN PARTICULAR FOR A TRANSMISSION JOINT

[75] Inventor: Michel A. Orain, Conflans Ste Honorine, France

[73] Assignee: Glaenzer Spicer, Poissy, France

[21] Appl. No.: 636,248

[22] Filed: Jul. 31, 1984

[30] Foreign Application Priority Data

Aug. 2, 1983 [FR] France .................................. 83 12725

[51] Int. Cl.⁴ .......................................... B61F 15/22
[52] U.S. Cl. .......................................... 277/212 FB
[58] Field of Search .............. 277/212 R, 212 FB, 32, 277/237 R, 212 F; 74/18.2

[56] References Cited

U.S. PATENT DOCUMENTS

| | | | |
|---|---|---|---|
| 3,403,932 | 10/1968 | Kutcher | 277/212 FB |
| 3,669,459 | 6/1972 | Bass | 277/212 F |
| 3,995,502 | 12/1976 | Jones | 277/212 FB |
| 4,020,307 | 4/1977 | Strubin | 277/212 FB |
| 4,116,115 | 9/1978 | Gross et al. | 277/212 FB |
| 4,369,979 | 1/1983 | Krude et al. | 277/212 FB |

*Primary Examiner*—Robert I. Smith
*Attorney, Agent, or Firm*—Wenderoth, Lind & Ponack

[57] ABSTRACT

In a transmission joint for rotating at high speed, a sealing device ensuring the retention of the lubricant comprises a bellows 9 of an elastomer and having an end wall 21 which is oriented radially and terminates in a heel portion 13 gripped in an annular groove 8 provided at the free end of a cap 4 surrounding one of the elements of the joint. In this way, there is obtained a minimum overall axial size of the joint and a good performance notwithstanding the effects of centrifugal force.

9 Claims, 7 Drawing Figures

SEALING DEVICE INCLUDING A BELLOWS, IN PARTICULAR FOR A TRANSMISSION JOINT

The present invention relates to sealing devices for constant-speed transmission joints and in particular for such joints which rotate at high speed.

This device is of the type comprising a bellows of a deformable material connected at both ends to two elements having axes which may make therebetween a variable angle, this bellows including at at least one of its ends a heel portion clamped in a member connected to the adjacent element.

In high-speed constant-speed joints employed at the present time, for example the tripod joints, the resiliently yieldable bellows ensuring the retention of the lubricant are subjected to high centrifugal accelerations, mainly in the regions of the folds of large diameter, the masses subjected to the forces being formed by the wall of the resiliently yieldable bellows and by the lubricant contained therein. The pressure resulting from the centrifugal force exerted on the wall is proportional to the square of its diameter and, consequently, in order to avoid the bursting of the bellows at high speeds, the outside diameter of the bellows in the region of its connection to the adjacent element of the joint must be made as small as possible.

One arrangement chosen in an attempt to safeguard the integrity of the bellows consists in providing at one end of the bellows an axial fold so as to bring the heel portion parallel to the axis of the bellows, this heel portion being clamped in an annular groove which is open in the axial direction and is obtained by folding at 180° the end portion of a sheet metal cap surrounding the tulip element in the case of a tripod joint. The heel portion is moreover maintained axially in this groove by means of an axial retaining ring placed behind this heel portion between a shoulder of the heel portion and the edge portion of the tulip element.

Such an arrangement, disclosed in FR-A-No. 1 347 809, has the major drawback of very substantially increasing the overall axial size of the joint, which is such as to forbid certain applications, such as that described in the patent FR-A-No. 2 416 811, employing two joints disposed symmetrically as a tandem at a very short distance from each other. Further, the large axial projection of the cap relative to the tulip element limits the possible angular movement of the joint since the transmission shaft wedges the wall of the axial fold of the bellows against the edge of the cap.

An object of the present invention is to provide a sealing device which avoids these drawbacks, i.e. which guarantees a good performance at high speed, with a small axial overall size. This result is obtained with a sealing device, in particular for a transmission joint, comprising a bellows of a deformable material, connected at both ends to a shaft connected to rotate with an interior element of the joint and to a cap connected to an exterior element of the joint, this bellows comprising at its end close to the cap a heel portion which is clamped in an annular groove of the cap, wherein said annular groove opens out radially toward the axis of said exterior element and the heel portion constitutes the free end of a wall of the bellows which is oriented roughly radially relative to said axis and connected to the other end of the bellows through two roughly radial folds.

According to other features of the invention:

as said member is a cap of sheet metal including a skirt for fixing to the adjacent element and a bent edge portion defining the annular groove, this bent edge portion projects radially outwardly relative to the fixing skirt;

the device is completed with an annular element clamped in said member along its outer periphery and constituting axial retaining means for the joint;

the fold including the wall defining the heel portion defines on its inner surface a bearing surface close to the shaft.

A better understanding of the invention will be had from the following description with reference to the accompanying drawings, in which identical reference numerals designate the same elements.

Figure 1:
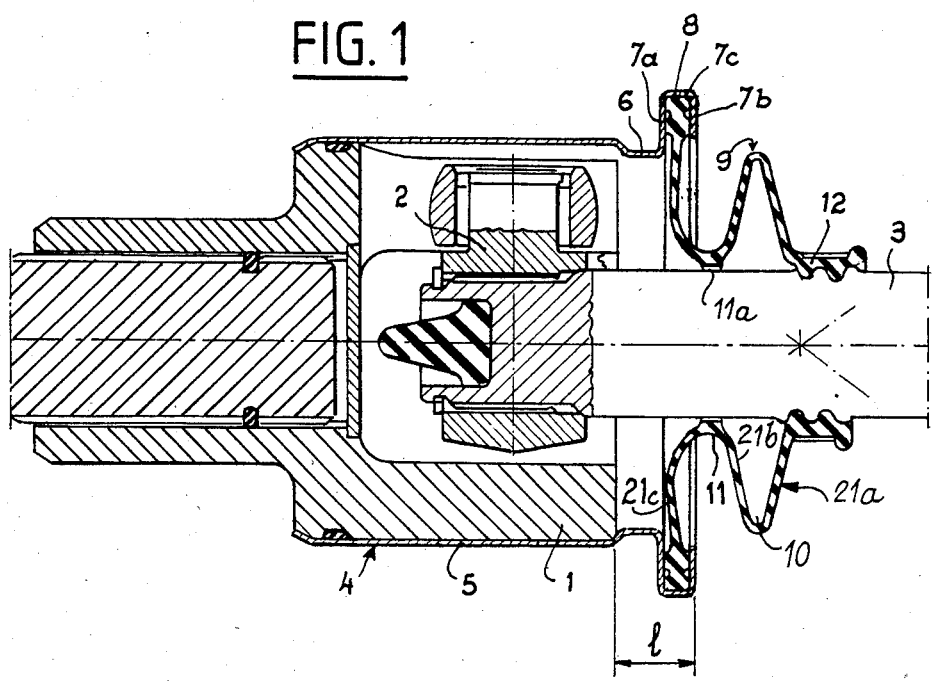
FIG. 1 is a diagrammatic longitudinal sectional view of a tripod joint provided with a sealing device according to the invention.

The tripod joint shown in FIG. 1 comprises, in the conventional way, a tulip element 1 in which is mounted a tripod element 2 connected to the end of a transmission shaft 3. A sheet metal cap 4 including a fixing skirt 5 surrounds this tulip element 1 and is extended axially toward the shaft 3 by a portion 6 which projects radially inwardly relative to the skirt. The cap 4 terminates in a folded edge portion 7 which projects radially outwardly. This folded edge portion has a U-shaped cross-section and includes two radial walls 7a, 7b interconnected by a bottom 7c. This folded edge portion 7 defines an annular groove 8 which opens out radially toward the axis of the tulip element 1.

A bellows 9 of a deformable material, for example an elastomer, including a first radial fold 10 and a second radial fold 11 respectively, is fixed to the transmission shaft 3 in a conventional manner by its neck portion 12 at one of its ends. At its other end, this bellows 9 includes a heel portion 13 which is inserted in the folded edge portion 7.

The folds 10, 11 are formed by three walls 21a, 21b, 21c, the wall 21b being common to the two folds and the fold 11 defines on its inner side a bearing surface 11a a which is preferably cylindrical and close to the shaft 3.

Figure 2:
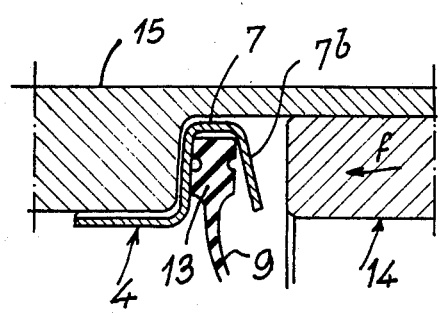
FIG. 2 is a longitudinal sectional view of the manner of clamping an end portion of a bellows which is part of the device shown in FIG. 1.

FIG. 2 shows the folded edge portion 7 of the cap 4 and the heel portion 13 of the bellows 9 ready to be assembled by a clamping operation. A clamping member 14 axially movable in the direction of arrow F and associated with a fixed abutment member 15 enables the second wall 7b of the folded edge portion 7 to be closed onto the U-portion 13 so as to obtain the final state illustrated in FIG. 3. The functions of the members 14 and 15 may also be reversed.

Figure 3:
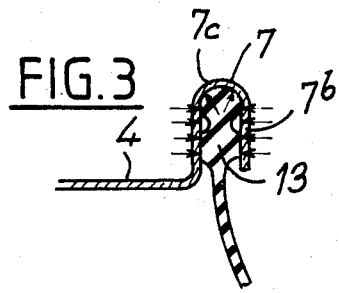
FIG. 3 is a view similar to FIG. 2 of the distribution of the pressures exerted as a result of this clamping in the end portion of the bellows shown in FIG. 2.
Figure 4:
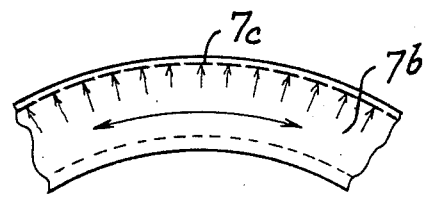
FIG. 4 is a partial end elevational view of the distribution of the pressures diagrammatically represented in FIG. 3.

As can be seen in FIG. 3, the second wall 7b of the folded edge portion 7 exerts an energetic pressure on the thickness of the heel portion 13 which is in this way held radially against the bottom 7c of the folded edge portion 7 and ensures that the fastening is completely reliable without requiring a member for radially retaining the heel portion 13. Indeed, as can be seen in more detail in FIG. 4, the force exerted by the wall 7b creates in the incompressible elastomer a tangential compression which urges the heel portion 13 against the bottom 7c and prevents the heel portion from escaping radially inwardly. It is important to note that in order to obtain such a hydrostatic pressure effect, the thickness or the axial dimension of the heel portion 13 in position as shown in FIG. 3 must be less than or equal to one half of its height (or radial dimension). Owing to this radial arrangement of the heel portion 13, the length 1 (FIG. 1) by which the cap 4 extends beyond the tulip element 1 is reduced relative to the arrangements known up to present time.

Figure 5:
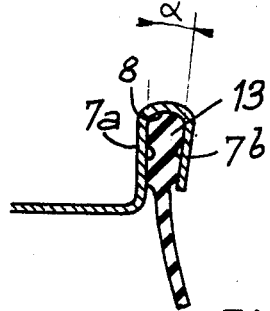
FIG. 5 is a partial longitudinal sectional view of a modification of the construction of the fixing of a bellows according to the invention.

It is also possible to effect on the wall 7b a more accentuated pinching, as can be seen in FIG. 5, in which this wall 7b forms with the first wall 7a a pinching angle α so as to reinforce the fixing of the heel portion 13 in the groove 8.

Figure 6:
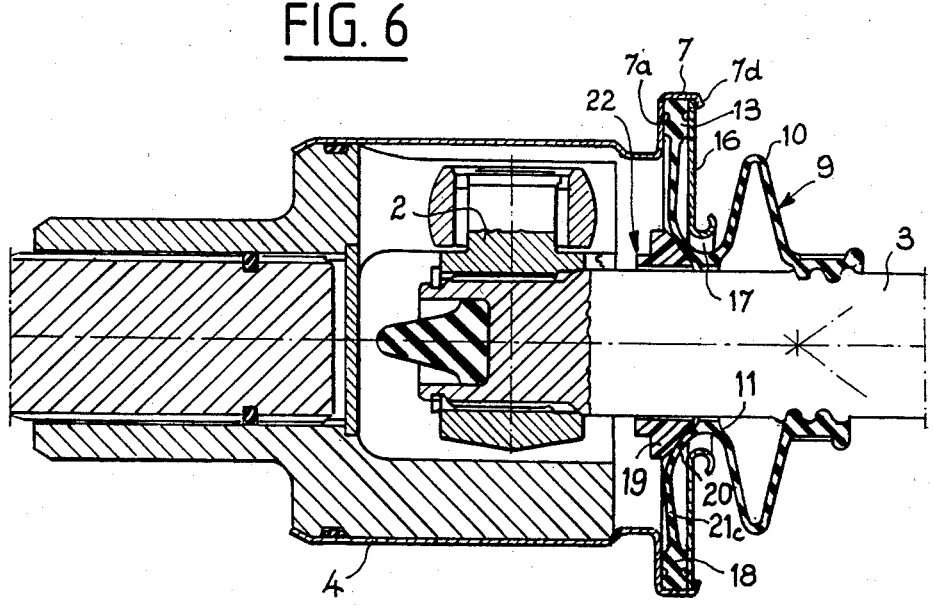
FIG. 6 is a longitudinal sectional view of a modification of the invention.

In the embodiment shown in FIG. 6, there are provided axial retaining means for the joint as concerns extension.

For this purpose, the folded edge portion 7 includes at its free end a nose portion 7d which is formed over for example by a forming wheel, onto a disc 16 including along its inner periphery a shoulder 17 adapted to allow a sufficient angular movement of the shaft 3. The heel portion 13 of the bellows 7 is clamped between the first wall of the folded edge portion and the radially outer edge portion 18 of the disc 16 owing to the nose portion 7d of the folded edge portion 7. Further, an abutment 19 of plastics material slidably mounted on the shaft 3 bears by its spherical surface 20 against the shoulder 17 of the disc 16 through the outer wall 21c of the bellows 9, when the tripod element 2 has reached its maximum axial extension and comes into contact with the flange 22 of the abutment 19. The axial retaining effect is thus ensured with the benefit of the damping effect due to the elasticity of the bellows.

Figure 7:
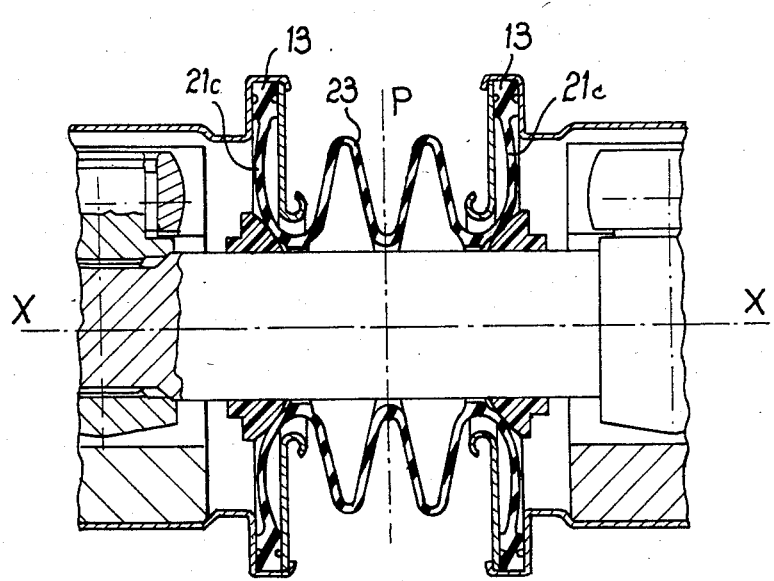
FIG. 7 is a longitudinal sectional view of another embodiment of the invention.

FIG. 7 shows a modification of the sealing device according to the invention which comprises a double bellows 23 which is symmetrical relative to a plane P perpendicular to the axis X—X of the bellows. The double bellows is derived from that shown in FIG. 6 and includes in particular two heel portions 13 and radial end walls 21c. This modification ensures in this way a minimum overall axial size of the joint.

According to another embodiment (not shown), the member surrounding the heel portion of the bellows may be arranged not to be continuous throughout the periphery of this heel portion.

According to the desired objects, the device according to the invention offers an improved behaviour as concerns centrifugal force, even at high rotating speed, while having a small axial overall size and allowing, if necessary, a large angular movement of the joint.

Further, whether this concerns a single bellows or a double bellows, the invention facilitates the moulding of the bellows when manufacturing the latter, since only a mould having a radial recess is necessary with no need to provide a mould having a negative taper, as is the case when the bellows includes axial portions.

The assembly of such bellows is also easy and reliable, since it requires only a simple tooling such as that illustrated in FIG. 2.

What is claimed is:

1. A sealing device, in particular for a transmission joint having an inner element connected to rotate with a shaft, an outer element having an axis of rotation and a cap connected to the outer element, the device comprising a bellows of a deformable material connected at one end to said shaft and connected at an opposite end to said cap, the cap defining an annular groove, said bellows including at its end adjacent the cap a heel portion clamped in said annular groove of the cap, said annular groove opening out radially toward said axis of rotation of said outer element and the heel portion constituting the free end of a wall of the bellows which is oriented roughly radially relative to said axis and connected to an opposite end of the bellows by two roughly radial folds.

2. A device according to claim 1, wherein said cap is of sheet metal including a skirt for fixing to the outer element of the joint and a folded edge portion defining the annular groove, said folded edge portion projecting radially outwardly relative to the skirt.

3. A device according to claim 2, wherein the cap defines between the skirt and the folded edge portion a portion which projects radially inwardly relative to the skirt.

4. A device according to claim 2, wherein the folded edge portion defining the groove has a U-shaped section having two branches which are oriented radially and are roughly parallel to each other.

5. A device according to claim 2, wherein the folded edge portion defining the groove has a U-shaped section having two branches which are radially oriented and are urged closer together at their ends.

6. A device according to claim 1, completed by an annular member having an outer peripheral portion gripped in said cap and constituting axial retaining means for the joint.

7. A device according to claim 1, wherein the heel portion placed in the annular groove has an axial dimension no more than one half of its radial dimension.

8. A device according to claim 1, wherein the fold including said wall defining the heel portion defines on an inner side thereof a bearing surface close to the shaft.

9. A device according to claim 8, wherein said bearing surface is cylindrical.

* * * * *